June 17, 1924. 1,497,935
J. F. O'CONNOR
FRICTION SHOCK ABSORBING MECHANISM
Filed Jan. 2, 1923 2 Sheets-Sheet 1

Fig.1

Witnesses
Wm. Geiger

Inventor
John F. O'Connor
By George J. Haight
His Atty.

June 17, 1924.

J. F. O'CONNOR

1,497,935

FRICTION SHOCK ABSORBING MECHANISM

Filed Jan. 2, 1923      2 Sheets-Sheet 2

Witnesses
Wm. Geiger

Inventor
John F. O'Connor
By George J. Haight
His Atty.

Patented June 17, 1924.

1,497,935

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 2, 1923. Serial No. 610,198.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms and, in part, is a continuation of my co-pending application, Serial Number 389,800 filed June 18, 1920 for improvement in friction shock absorbing mechanisms.

One object of the invention is to provide a friction shock absorbing mechanism of that type adapting it to cushion extremely heavy shocks under high speed and more particularly such a mechanism which is especially adapted for railway draft riggings.

Another object of the invention is to provide a mechanism of the character indicated, capable of use wherever heavy shocks are to be cushioned, including railway draft riggings, and wherein are obtained high frictional capacity, combined with assured release, the arrangement being such that the high frictional capacity is developed during the compression stroke, by a system of wedge and friction elements having the attributes of a keen angle system, the release and return of the parts to normal position being obtained by the same system of friction units but which has the attributes of a blunt releasing angle wedge system, during the release action.

Another object of the invention is to provide a mechanism of the character indicated in the foregoing, wherein are employed, a friction shell proper of substantially cylindrical form and a wedge friction-shoe system cooperable with such shell with the shoes arranged in a circular series and in such manner as to insure balanced pressure between all shoes and the shell, this arrangement resulting in maximum friction wearing areas for a given amount of metal, minimum size, and most efficient operation.

More specifically, an object of the invention is to provide a mechanism of the character indicated wherein are employed a pressure transmitting wedge and a plurality of wedge-friction-shoes cooperable therewith with some of the engaging faces of the wedge and the shoes differing in angle from each other, by reason of which there will be an unequal travel of the shoes induced during the compression stroke, but with the parts so arranged with relation to the usual spring resistance that all of the parts, at the end of the release action, will be automatically restored to their true normal position and with the parts in condition to receive another compression.

Other objects of the invention will more clearly appear from the description and claims hereinafter following.

In the drawings forming a part of this specification, Figure 6 is a view of the spring follower or cap looking at it from its forward side, indicating by dotted lines thereon the extent of the area which is engaged by the inner ends of the blunt angle shoes, hereinafter referred to.

In said drawings, 10—10 indicate the usual draft or center sills of a car underframe, said sills being preferably of channel cross-section and to the inner faces of which are secured front stop lugs 11 and rear stop lugs 12, of usual construction. As will be understood by those skilled in the art, any other equivalent front and rear stop means may be employed. A portion of a draw bar is indicated at 13, the same having operatively associated therewith a hooded cast yoke 14 of well known form and within which is disposed the shock absorbing mechanism proper, hereinafter described, a front main follower 15, and a rear main follower 16. The friction shock absorbing mechanism proper, illustrated in the drawings, is of that type employing a substantially cylindrical combined friction shell and cage and in order that it be maintained in proper central position, the draft sills 10 may have secured to the inner faces thereof, guide plates 17—17. The yoke and parts contained therein are supported in operative position by a detachable saddle plate 18.

The improved shock absorbing mechanism proper, as shown, comprises a combined friction shell and spring cage casting A; a pressure-transmitting wedge B; three friction shoes C, D and E; a spring resistance F; a spring follower or cap G; and a retainer bolt H.

Figure 7:
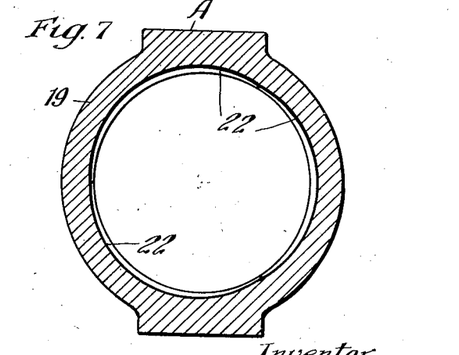
Figure 7 is a transverse sectional view of the friction shell proper corresponding to the section line 4—4 of Figure 1, with certain structural features thereof exaggerated to more clearly illustrate the interior formation of the friction shell.

The casting A is of generally cylindrical form having the friction shell proper 19 thereof formed at the open or front end. Rearwardly of the friction shell proper, the casting provides a cylindrical spring cage or casing 20 and its rear end, the casting A has an integral transverse wall 21, bearing on the follower 16. The friction shell proper 19, is preferably of the following formation, as best illustrated by reference to Figures 1, 2 and 7. The interior of the shell 19, while of generally cylindrical formation, is preferably comprised of three true cylindrical surfaces 22—22, symmetrically arranged around the axis, and each of approximately 120° extent. Said cylindrical surfaces 22—22 are converged inwardly of the shell on a relatively slight taper and in such manner that the inner ends of said three cylindrical surfaces 22 coalesce so as to form a true circle. As shown best in Figure 7, where the structure is somewhat exaggerated, the interior of the outer end of the shell proper will present an approximately clover-leaf like form. With this arrangement, the friction shoes which have true cylindrical surfaces as hereinafter described, will maintain true surface contact, as distinguished from line contact with the shell, at all positions during a compression stroke. Furthermore, by bringing the cylindrical surfaces 22 of the shell to a true circle at the inner end, the minimum amount of metal is required for a given minimum diameter of shell and given taper, without militating against the strength of the shell.

Figure 1:
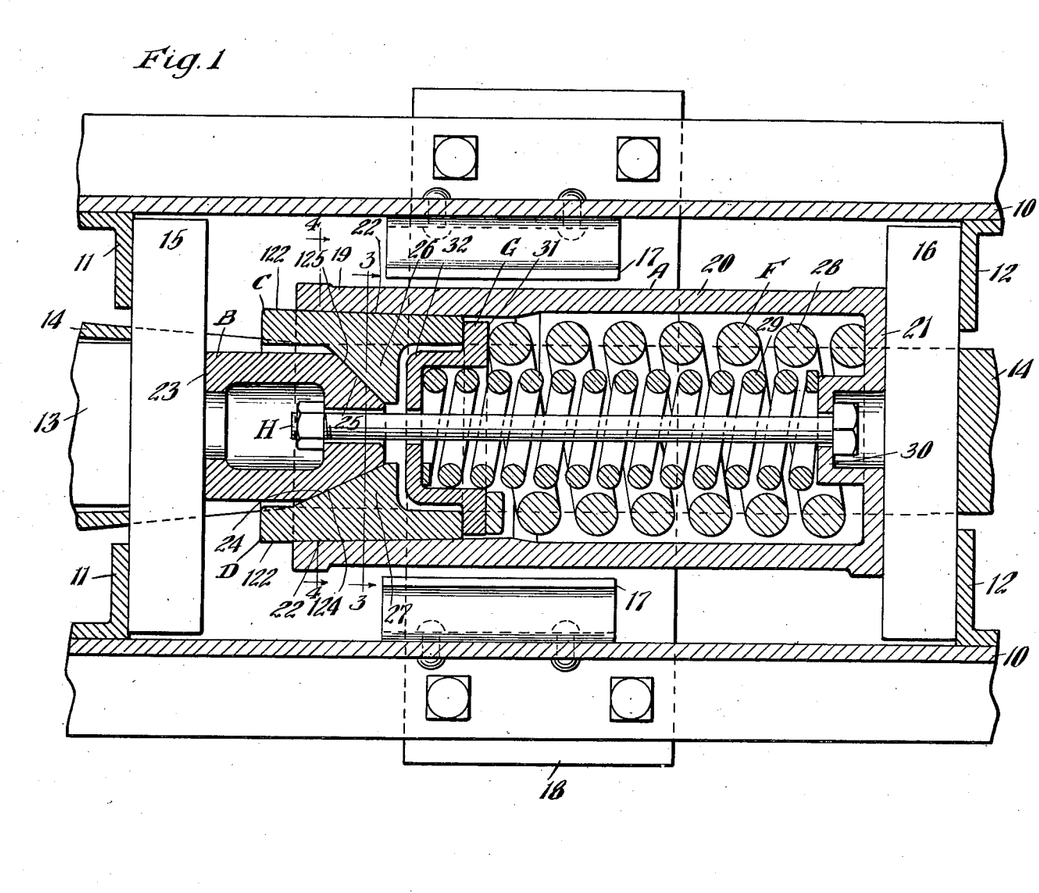
Figure 1 is a longitudinal sectional view of a portion of a railway draft rigging, the section through the shell and friction elements therewithin corresponding to two section planes at approximately 120° apart.
Figures 2, 4:
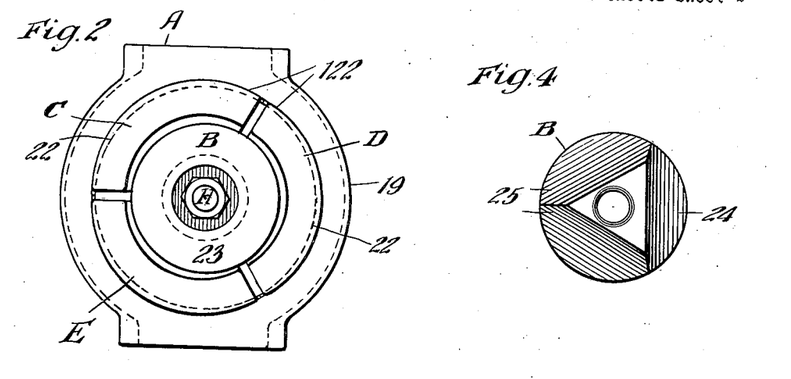
Figure 2 is a front end elevational view of the shock absorbing mechanism proper.
Figure 4 is an end elevational view of the pressure-transmitting wedge looking toward the inner end of the wedge.

The wedge B, through which the pressure is transmitted, is in the form of a hollow casting having a front transverse bearing face 23 engaging the front follower 15. At its inner end said wedge B is provided with a true wedge face 24 and two other rearwardly converged inclined faces 25—25, all of said faces 24 and 25, as best shown in Figure 4, being disposed around the center or axis of the wedge and giving to the wedge the appearance of a truncated, somewhat irregular triangular pyramid. It will be noted from an inspection of Figures 1 and 3, that the three inclined faces 24 and 25 are so disposed that, a transverse section taken through the wedge B, will intersect all three faces.

The two friction shoes C and E, preferably in the form of castings, are of like construction, each having an outer friction surface 122 which corresponds to a portion of a true cylindrical surface and which extends through an arc of approximately 120°. On its inner side, that is the side nearest the axis of the shell, each shoe C and E is provided with a lateral enlargement 26 on the front side of which is provided a rearwardly and inwardly inclined face 125 corresponding in angle to and cooperating with one of the inclined faces 25, as clearly shown in Figures 1 and 3.

Figure 3:
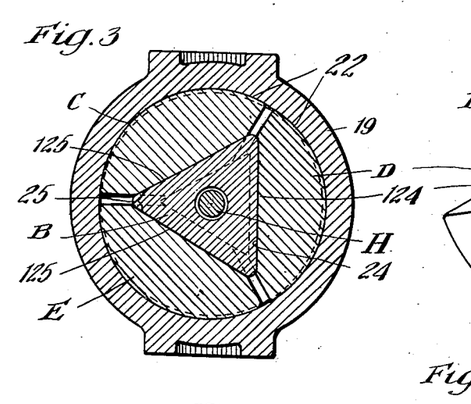
Figure 3 is a vertical transverse sectional view corresponding to the section line 3—3 of Figure 1.
Figure 5:
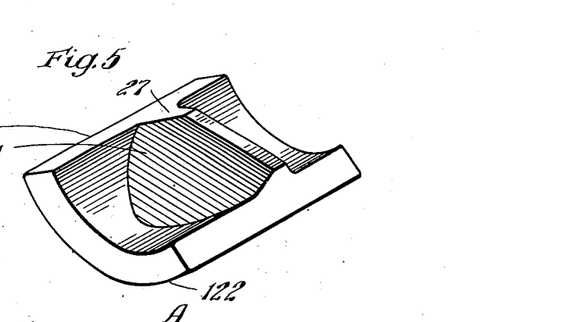
Figure 5 is a detail perspective of one of the friction-shoes.

The third or remaining shoe D is provided with a similar outer cylindrical friction surface 122 and on its inner side with an inwardly projecting enlargement 27 having an inclined wedge face 124 corresponding in angle to and co-acting with the true wedge face 24 of the wedge B. The faces 125 and 124 of the shoes are so disposed that the front ends of the shoes will normally lie approximately flush with each other and at a point approximately an inch outside of the end of the shell.

The spring resistance F, as shown, comprises an outer heavy coil 28 bearing at its inner end against the wall 21 of the casting A and an inner lighter coil 29 bearing at its inner end upon a hollow cup-like boss 30 formed integral with the wall 21.

The spring follower or cap G, is more or less cup-shaped having a heavy annular flange 31 on the inner side of which is adapted to bear the front end of the outer coil 28. Said spring follower or cap G has a forwardly extended integral cup-shaped section 32, the interior of which provides a bearing for the front end of the inner coil 29.

The retainer bolt H is anchored at its rear end within the boss 30 and at its forward end within a suitable recess provided within the wedge B, the latter and the spring follower G being suitably apertured to accommodate the shank of the bolt. Said bolt not only serves to maintain the parts assembled, but is also utilized to adjust the parts to the proper over-all length and maintain them in this position when under full release.

From a series of extensive tests, I have found that an extremely efficient gear producing high capacity and always certain of release is obtained by employing a taper of $\frac{3}{16}$ of an inch in eight inches for each surface, that is, a reduction in diameter of $\frac{3}{8}$ of an inch from the forward end of the shell to the inner end thereof when the shell surfaces are eight inches long. I have also found that a desirable angle to employ on the co-acting wedge faces 24 and 124 is 25° to 30° and, on the blunt angle faces 25 and 125, 45°. The figures above given are in the case of a gear employing a malleable iron friction shell; steel shoes; and a hard iron or malleable wedge. The figures given are those preferred, but I am aware from experiments conducted, that variations in these figures are permissible and still obtain an efficient mechanism. I believe the following are desirable limits: taper between $\frac{1}{8}$ and $\frac{1}{4}$ inch in eight inches; the angle of the keen wedge faces between $22\frac{1}{2}$° and 35°, and the angle of the blunt faces 25 and 125 between 40° and $47\frac{1}{2}$°.

As is well known to those skilled in the art, the exact action which takes place in a mechanism of this character, is extremely difficult to describe specifically, and furthermore, a certain action may take place when the mechanism is compressed slowly, as in a Riehle machine, and a different action when tested under the well-known 9,000 pound drop hammer. Inasmuch as the drop hammer test more nearly reproduces the quick action, under switching conditions, which ordinarily takes place in a draft rigging mounted on a car, I will now describe the operation of the mechanism as it occurs under the drop hammer.

Figure 6:
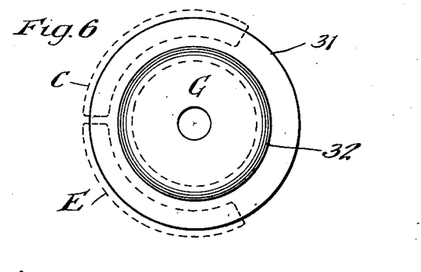

Assuming a buffing or compressive action applied to the draft rigging, the operation is as follows, under rapid action. As the wedge B is forced inwardly of the shell, there will be, initially, a slight movement of the wedge B inwardly with respect to the keen angle shoe D, evidently due to the inertia of the shoe and the fact that, on account of the relatively keen angle, slippage of the faces 24 and 124 is possible. During this initial action, the two blunt angle shoes C and E will move longitudinally inwardly of the shell, substantially in unison with the wedge B, on account of the blunt relatively non-wedging angle of the cooperating faces 25 and 125, thus advancing the shoes C and E longitudinally slightly ahead of the keen angle shoe D. The foregoing described initial action sets up the desired pronounced spreading action. As the parts continue their movement inwardly of the shell, further slippage between the keen angle faces 24 and 124 is substantially nil, but, due to the taper of the shell surfaces, there must be a relative lateral approach of the shoes which is permitted by the shoes C and E moving radially inward with respect to the wedge B, the slippage occurring on the blunt angle faces 25 and 125, which act as sort of "safety valve" for this purpose. This differential action further advances the shoes C and E longitudinally ahead of the shoe D and the action so continues until the end of the compression stroke. During the compression stroke as above described, and due to the advance of the shoes C and E relative to the shoe D, the spring follower or cap G will be displaced or removed from the inner end of the shoe D. In this connection, special reference is now made to Figure 6, where it will be noted that the extent of the contact between the inner ends of the two blunt angle shoes C and E with the flange 31 of the spring cap G, is approximately 240°, that is, appreciably more than half of the circumference of the spring cap flange 31. With this arrangement, the two shoes C and E advancing together in unison, the spring cap G is maintained in its proper position, that is at right angles to the axis of the mechanism, and without the possibility of the spring cap being tilted by the pressure of the spring. While the spring follower or cap G is out of engagement with the inner end of the keen angle shoes D during the compression stroke, as above described, nevertheless, it will be apparent that the shoe D always affords resistance because of the friction between the surface 122 thereof and the shell surface 22, this friction acting to retard the shoe D with gradually increasing force always during the compression stroke. The friction shell, being of metal, preferably malleable iron, is capable of a limited amount of radial expansion which takes place during the compression of the mechanism. With the degree of taper hereinbefore referred to, the expansion cannot neutralize the taper therefore, and a differential action is assured.

Upon removal of the actuating or compressing force, there is an initial releasing action induced by the radial inward contraction of the shell. These forces produce a relative approach toward the center line of the mechanism of all three shoes and this, in turn, causes the pressure-transmitting wedge B to be squeezed out from between the shoes, said action being facilitated by reason of the blunt angle faces 25 and 125 on the wedge and blunt shoes, respectively, it being observed that the faces 25 and 125 now act substantially as true wedge faces with respect to the radial inward contracting forces. The contraction of the shell continues until the shell has either resumed its normal condition or until the contracting forces have been reduced to a point where the stored-up energy in the spring exceeds the longitudinal resistance to release the same. The initial release action, just described, results in loosening the wedge B sufficiently to permit the reduction of the pressure between the friction surfaces of the various shoes and the shell friction surfaces, whereupon the spring becomes effective to commence moving all of the friction elements outwardly of the shell. At the beginning of the outward movement just referred to, the spring follower or cap G will obviously move the two blunt angle shoes C and E in an outward direction which, in turn, picks up the wedge B sufficiently to loosen the keen angle wedge faces 124 and 24, so that immediately thereafter, the flange of the spring follower or cap G will pick up the inner end of the keen angle shoe D and also move it out longitudinally. The outward movement referred to, continues until the wedge B is limited against further movement by the bolt H. The three shoes will then be forced into their normal position and, on account of the extended area of contact between the two blunt angle shoes and the spring follower, which maintains the latter perpendicular to the axis, all three shoes will be brought to rest with their inner ends flush, as shown best in Figure 1. In this connection, I wish to point out the important function performed by the spring follower or cap G in conjunction with the two blunt angle shoes as above described, and by which arrangement I positively prevent any forward creeping of the keen angle shoe and a relative outward creeping of the wedge on the blunt angle shoes which might otherwise tend to lock the friction unit, were the spring follower allowed to tilt, and thus push the keen shoe D forwardly in advance of the other shoes.

Although it will be observed that the pressure-transmitting wedge is not symmetrical with respect to its axis, nevertheless, by employing the three inclined faces 24 and 25 transversely opposite each other, and three shoes with cylindrical surfaces cooperating with other cylindrical shell surfaces, I insure an equalized pressure against the shell for all three shoes and an automatic centering of the wedge with respect to the shoes.

The arrangement which I have shown is exceedingly efficient in operation; the initial cost is low inasmuch as each of the friction-shoes and the wedge may be made in the form of a casting with all the active faces thereof of such character that they may readily be dressed down without complicated or expensive machinery. Furthermore, the shoes are of heavy substantial construction, which is also true of the wedge.

While I have herein shown and described my improvement as employed with a casting of substantially cylindrical form throughout, nevertheless, it will be appreciated by those skilled in the art that the invention may be embodied in gears of other type and also that various changes and modifications may be made in certain details of construction, without in anywise departing from the spirit of the invention. All such changes, modifications and variations are contemplated that come within the scope of the claims appended hereto.

I claim:

1. In a friction shock absorbing mechanism, the combination with a friction shell having interior friction surfaces arranged circularly; of a series of friction shoes within and cooperable with said shell and arranged in a circular series; a spring resistance; and spreader means cooperable with said shoes, said shoes and spreader means having a plurality of cooperating sets of faces, part of which are arranged at a relatively keen wedge-acting angle and others at a relatively blunt releasing angle, all of said sets of faces being inclined to the axis and toward the same end of the shell.

2. In a friction shock absorbing mechanism, the combination with a friction shell having interior friction surfaces arranged circularly; of a series of friction shoes within and cooperable with said shell and arranged in a circular series; a spring resistance; and spreader means cooperable with said shoes, said shoes and spreader means having a plurality of cooperating sets of faces, part of which are arranged at a relatively keen wedge-acting angle and others at a relatively blunt releasing angle, said spreader means comprising a single pressure-transmitting block.

3. In a friction shock absorbing mechanism, the combination with a friction shell having interior friction surfaces arranged circularly, said shell friction surfaces being converged inwardly of the shell; of friction shoes cooperable with said shell and arranged in a circular series there-between; a spring resistance; and spreader means cooperable with said shoes, said shoes and spreader means having a plurality of cooperating sets of faces, part of which are arranged at a relatively keen wedge-acting angle with respect to forces applied substantially parallel to the axis of the shell, and others at a relatively blunt releasing angle, all of said faces being converged in the same general direction.

4. In a friction shock absorbing mechanism, the combination with a friction shell having interior friction surfaces arranged circularly, said shell friction surfaces being converged inwardly of the shell; of friction-shoes cooperable with said shell and arranged in a circular series therebetween; a spring resistance; and spreader means cooperable with said shoes, said shoes and spreader means having a plurality of cooperating sets of faces, part of which are arranged at a relatively keen wedge-acting angle with respect to forces applied substantially parallel to the axis of the shell, and others at a relatively blunt releasing angle, said spreader means comprising a single pressure-transmitting block.

5. In a friction shock absorbing mechanism, the combination with a cylindrical friction shell having interior cylindrically arranged friction surfaces; of a spring resistance; a plurality of friction-shoes operating within the shell and arranged in a circular series therewithin; a shock-transmitting wedge operating between said shoes, one of said shoes having a wedge face at an angle which is acute and of high friction-creating capacity and non-releasing, another friction shoe in opposed relation having a face engaged by said wedge at a wedge-releasing angle.

6. In a friction shock absorbing mechanism, the combination with a friction shell having interior circularly arranged friction surfaces; of a spring resistance; a series of three friction shoes slidable within said shell and arranged in a circular series; and a movable wedge acting between the shoes, said shoes having inner faces inclined one to the other at an angle from within which the wedge is readily releasable upon discontinuance of the actuating and compressing force, the face on one of said shoes being at an acute angle to create high frictional capacity and of such an acute angle, per se, that the initial collapse of the shoes and wedge necessarily occurs on other faces.

7. In a friction shock absorbing mechanism, the combination with a friction shell having interior friction-surfaces converged inwardly of the shell, said surfaces being each of cylindrical form; of a spring resistance; a series of friction shoes corresponding in number to the number of said shell friction surfaces, each of said friction shoes having an outer cylindrical friction surface cooperable with a shell friction surface; a shock-transmitting wedge operating between said shoes, one of said shoes having a wedge face at an angle which is acute and of high friction-creating capacity, and another shoe in opposed relation with respect to said acute angle shoe, having a face engaged by said wedge at a releasing angle.

8. As an article of manufacture, a pressure-transmitting wedge for a friction shock absorbing mechanism, said wedge having a bearing face at one end thereof and, at its other end, three converged faces arranged around the longitudinal axis of the wedge, all of said converging faces being inclined with respect to said axis and at least two of said faces being inclined at different angles with respect to said axis.

9. In a friction shock absorbing mechanism, the combination with a friction shell having interior friction surfaces arranged circularly; of a series of friction-shoes within and cooperable with the shell friction surfaces and arranged in a circular series; a spring resistance; spreader means cooperable with said shoes, said shoes and spreader means having a plurality of cooperating sets of faces, part of which are arranged at a relatively keen wedge-acting angle and others at a relatively blunt releasing angle and whereby certain of the shoes will be advanced longitudinally inwardly of the shell a greater distance than the remainder of the shoes; and a spring follower interposed between said spring and the inner ends of the shoes, the extent of contact between said spring follower and said shoes having the greater longitudinal travel being such that said spring follower is maintained perpendicular to the axis of the mechanism at all times.

10. In a friction shock absorbing mechanism, the combination with a friction shell having interior friction surfaces arranged circularly, said shell friction surfaces converging inwardly of the shell; of a series of friction-shoes within and cooperable with the shell friction surfaces and arranged in a circular series; a spring resistance; spreader means cooperable with said shoes, said shoes and spreader means having a plurality of cooperating sets of faces, part of which are arranged at a relatively keen wedge-acting angle and others at a relatively blunt releasing angle and whereby certain of the shoes will be advanced longitudinally inwardly of the shell a greater distance than the remainder of the shoes; and a spring follower interposed between said spring and the inner ends of the shoes, the extent of contact between said spring follower and said shoes having the greater longitudinal travel being such that said spring follower is maintained perpendicular to the axis of the mechanism at all times.

11. In a friction shock absorbing mechanism, the combination with a friction shell having interior inwardly converged friction surfaces, said surfaces being arranged circularly; of a plurality of friction-shoes cooperable with said shell friction surfaces and arranged in a circular series; a spring resistance; a pressure-transmitting wedge disposed between and cooperating with said shoes, one of said shoes and wedge having cooperating faces extending at a relatively acute wedging angle with respect to the axis of the mechanism and another opposed friction-shoe and the wedge having cooperating faces inclined at a relatively blunt angle with respect to the axis; a spring follower interposed between said springs and the shoes, said keen angle shoe and the follower having engagement extending through an arc of substantially less than 180°.

12. In a friction shock absorbing mechanism, the combination with a friction shell having cylindrical interior friction surfaces; of a spring resistance; three friction-shoes arranged in a circular series, each shoe extending through an arc of approximately 120°, one of said shoes having a keen angle wedge face and the remaining two shoes having inclined faces extending at a relatively blunt angle with respect to the axis of the shell; pressure-transmitting wedging means having correspondingly inclined faces cooperating with those of the shoes; and a spring follower interposed between the inner ends of the shoes and the spring and with which the inner ends of the blunt angle shoes have an arc of contact of approximately 240°, whereby said follower is maintained always substantially perpendicular to the axis of the shell.

13. In a friction draft gear, in combination: a column-acting friction member having longitudinally extending friction surfaces relatively converged in the direction of length of said member, said member being adapted to be mounted on a car and held stationary under a compressing force applied in one direction; a spring resistance; movable means producing cushioning friction with said member when an actuating force is applied to said movable means, said movable means comprising a plurality of elements, one of which is adapted to receive the actuating force and at least two of which are adapted to have frictional engagement with said friction surfaces of said member, certain of said elements comprising a group involving less than the entire number of elements, having cooperating engaging faces inclined to the axis of the gear at a blunt and releasing angle, and certain of said elements constituting a second group including at least one of the elements in the first group and an additional element having cooperating engaging faces inclined relative to the axis of the gear at a more acute and wedge-acting angle, said sets of cooperating faces being opposed transversely of the gear.

14. In a friction shock absorbing mechanism, the combination with a friction shell having interior curved friction surfaces; of a spring resistance; a plurality of friction-shoes cooperating with the shell friction surfaces, one of said shoes having a face inclined inwardly toward the axis of the shell at an angle thereto between the limits of 20° and 35°, another of said shoes having a face inclined inwardly toward the axis of the shell at an angle between the limits of $37\frac{1}{2}°$ and $47\frac{1}{2}°$; and wedge-pressure-transmitting means having inclined faces corresponding to and cooperable with the inclined faces of the shoes.

15. In a friction shock absorbing mechanism, the combination with a friction shell having interior curved friction surfaces converged inwardly of the shell with a degree of taper in excess of one-eighth inch in eight inches; of a spring resistance; a plurality of friction-shoes cooperable with the shell friction surfaces, said shoes having inner faces inclined inwardly of the shell toward the axis thereof and at different angles; and wedge-pressure-transmitting means having inclined faces corresponding to and cooperable with the said inclined faces of the shoes.

16. In a friction shock absorbing mechanism, the combination with a freition shell having interior friction surfaces tapered inwardly of the shell, the taper of each surface exceeding one-eighth inch in eight inches; of a spring resistance; and a friction unit comprising a plurality of elements, one of which is adapted to receive the actuating pressure and at least two of which are adapted to have frictional engagement with the shell friction surfaces, certain of said elements comprising a group involving less than the entire number of elements, having cooperating engaging faces inclined relative to the axis of the mechanism at an angle between the limits of $37\frac{1}{2}°$ and $47\frac{1}{2}°$, and certain of said elements constituting a second group including at least one of the elements in the first group and an additional element, having cooperating sets of faces inclined relative to the axis of the shell at an angle between the limits of 20° and $32\frac{1}{2}°$, said sets of cooperating faces being transversely opposed.

17. In a friction shock absorbing mechanism, the combination with a friction shell having interior inwardly tapered friction surfaces with a taper in excess of one-eighth of an inch in eight inches; of a spring resistance; and a plurality of wedge friction elements, one of said elements being adapted to receive the actuating pressure and having at least two transversely opposed faces converged inwardly of the shell and extending at different angles with respect thereto, the angle of one of said faces with the axis approximating $27\frac{1}{2}°$ and the angle of another face with the axis of the shell approximating $42\frac{1}{2}°$, the remaining elements having friction surfaces cooperable with the shell friction surfaces and faces cooperable with the inclined faces of the pressure-receiving element.

18. In a friction shock absorbing mechanism, the combination with a friction shell having three interior cylindric friction surfaces tapered inwardly of the shell with a taper in excess of one-eighth inch in eight inches, said cylindric surfaces being symmetrically arranged with respect to the axis of the shell; of a spring resistance; three friction shoes each having an outer cylindric friction surface cooperable with the friction surface of the shell, two of said shoes having inner faces inclined inwardly of the shell toward the axis thereof at an angle approximating 42½°, the remaining shoe having an inner face inclined inwardly of the shell toward the axis thereof at an angle approximating 27½°; and a pressure-transmitting wedge having three inclined faces corresponding to and co-acting with the respective inclined faces on the three shoes.

19. In a friction shock absorbing mechanism, the combination with a friction shell having three interior cylindric friction surfaces tapered inwardly of the shell with a taper in excess of one-eighth inch in eight inches, said cylindric surfaces being symmetrically arranged with respect to the axis of the shell; of a spring resistance; three friction-shoes each having an outer cylindric friction surface cooperable with a friction surface of the shell, two of said shoes having inner faces inclined inwardly of the shell toward the axis thereof at an angle approximating 42½°, the remaining shoe having an inner face inclined inwardly of the shell toward the axis thereof at an angle approximating 27½°; a pressure-transmitting wedge having three inclined faces corresponding to and co-acting with the respective inclined faces on the three shoes; and a spring follower interposed between the spring resistance and the inner ends of the shoes and with which the blunt angle shoes have a bearing extended through an arc in excess of 180°.

20. In a friction shock absorbing mechanism, the combination with a column-acting member having three friction surfaces tapered relative to the axis of said member, the taper being in excess of one-eighth inch in eight inches; of a spring resistance; three friction shoes each having a friction surface cooperable with one of said friction surfaces of the column-acting member; and wedge pressure-transmitting means, at least one of said shoes and said means having coacting faces inclined to the axis of said member at an angle between the limits of 20° and 32½°, at least another shoe and said means having coacting faces inclined to said axis at an angle between the limits of 37½° and 47½°.

21. In a friction shock absorbing mechanism, the combination with a column-acting member having three longitudinally extending friction surfaces inclined relative to the axis of said member, the inclination being in excess of one-eighth inch in eight inches; of a spring resistance; three friction-shoes each having a friction surface cooperable with a friction surface of said member; wedge-pressure-transmitting means, said means and one of said shoes having coacting faces inclined to the axis of said mechanism at an angle between the limits of 20° and 32½°, the other two shoes and said means having coacting faces inclined to said axis at an angle between the limits of 37½° and 47½°.

22. In a friction shock absorbing mechanism, the combination with a friction shell having interior friction surfaces; of friction-shoes cooperable with said shell; a spring; and spreader means cooperable with said shoes, said shoes and spreader means having a plurality of cooperating sets of faces, part of which are arranged at a keen relatively wedge-acting angle and others at a blunt relatively non-wedge-acting angle during the compression action, said faces acting in a relatively opposite manner during initial release.

23. In a friction shock absorbing mechanism, the combination with a friction member having longitudinally extending friction surfaces; of friction-shoes cooperable with the surfaces of said member; a spring; and a pressure-transmitting member, said pressure-transmitting member and shoes having cooperating faces, some arranged at a keen relatively wedge-acting angle and others at a blunt relatively non-wedge-acting angle during the compression action, said faces acting in a relatively reverse manner during initial release.

24. In a friction shock absorbing mechanism, the combination with a friction shell having interior friction surfaces; of friction-shoes cooperable with said shell; a spring; and spreader means cooperable with said shoes, said shoes and spreader means having faces arranged partly at a keen relatively wedge-acting angle and partly at a blunt relatively non-wedge action angle during the compression action, said faces acting in a relatively opposite manner during initial release, said spreader means comprising a single block.

25. In a friction shock absorbing mechanism, the combination with a friction member having longitudinally extending friction surfaces; of a plurality of friction-shoes cooperable with the surfaces of said member; a spring; and a combination pressure wedge member cooperable with said shoes, one of said shoes and wedge member having co-acting sets of faces arranged at a keen relatively wedge-acting angle during compression, another shoe and said pressure wedge member having co-acting faces extending at a blunt relatively non-wedge-acting angle during the compression action.

26. In a friction shock absorbing mechanism, the combination with a friction shell having opposed inner friction surfaces slightly inwardly converging; of a plurality of friction-shoes cooperable with said friction surfaces of the shell; a spring; and a single piece pressure-transmitting and wedge-acting element, said element and one of the shoes having cooperating sets of faces arranged at a keen relatively wedge-acting angle during the compression stroke, said element and a different shoe having cooperating sets of faces extending at a blunt relatively non-wedge-acting angle during the compression stroke.

27. In a friction shock absorbing mechanism, the combination with a friction shell and a spring cage, the interior of said shell having opposed longitudinally extending friction surfaces; of a spring mounted within the cage; friction-shoes cooperable with the shell, one of said shoes having a face extending at a keen relatively wedge-acting angle with respect to the axis of the shell and another shoe having a face extending at a blunt relatively non-wedge-acting angle with respect to the axis of the shell; and a single piece wedge cooperable with the shoes, said wedge having corresponding keen and blunt angle faces engaging the corresponding faces of the shoes.

28. In a friction shock absorbing mechanism, the combination with a casting having a friction shell at one end thereof and an integral spring cage, the interior of said shell having longitudinally extending friction surfaces; of a spring mounted within the cage portion of said casting; friction-shoes cooperable with said shell; and spreader means cooperable with said shoes, said shoes and spreader means having a plurality of cooperating sets of faces, part of which are arranged at a keen relatively wedge-acting angle and others at a blunt relatively non-wedge-acting angle, during the compression stroke, said faces acting in a relatively opposite manner during release.

29. In a friction shock absorbing mechanism, the combination with a friction shell having friction-generating areas on the interior thereof, said shell being subject to expansion and contraction laterally; of a spring resistance and an expansible and collapsible friction unit comprised of a plurality of elements, some of said elements, considered as one group, having cooperating faces acutely inclined to the axis of the shell and operable as true wedge-acting faces in compression upon the application of pressure thereto, some of said elements, including one element of said first group and an element not included therein, considered as a second group, having cooperating faces more obtusely inclined to the axis of the shell and non-wedge-acting in compression; said true wedge-acting faces and said non-wedge-acting faces being unsymmetrically disposed with respect to said axis, the outer faces of the outermost elements frictionally cooperating with the friction shell.

30. In a friction shock absorbing mechanism, the combination with a friction shell; of a spring; and an expansible and collapsible friction unit within the shell and movable longitudinally thereof, said unit including friction-shoes and a wedge subject to direct pressure in line with the shell during all portions of a compression stroke, said wedge having faces extended both at a relatively acute and a relatively blunt angle with respect to the line of applied force, the friction-shoes having cooperating corresponding faces, the cooperating relatively blunt faces insuring release.

31. In a friction shock absorbing mechanism adapted to be actuated by a draw bar, the combination with a friction shell; of a spring; a plurality of friction-shoes cooperable with the shell, the shoes having inner faces inclined with respect to the axis of the shell, the inclination of a face of one shoe being different from that of another shoe whereby said two shoes are unlike; and pressure-transmitting wedging devices movable simultaneously and uniformly with the draw bar having faces corresponding to and cooperable with said defferently inclined faces of the shoes.

32. In a friction shock absorbing mechanism, the combination with a friction shell; of a spring; a plurality of friction-shoes cooperable with the shell, the shoes having inner faces inclined with respect to the axis of the shell, the inclination of a face of one shoe being different from that of another shoe, whereby said two shoes are unlike; and pressure-transmitting wedging means having faces corresponding to and cooperable with said differently inclined faces of the shoes, said means consisting of a single block.

33. In a friction shock absorbing mechanism, the combination with a friction shell having the interior thereof slightly inwardly converging; of a spring; a plurality of opposing friction-shoes cooperable with the shell, one shoe having a wedge face inclined at one angle relatively toward the axis of and inwardly of the shell and an opposing shoe having an inner face inclined at a different angle toward the axis of and inwardly of the shell; and a wedge cooperable with both of said opposing shoes.

34. In a friction draft gear in combination: friction means adapted to be mounted on a car and held stationary under buff; a spring resistance; movable means producing cushioning friction with said stationary means when buffing strains are transmitted to said movable means, said movable means including two parts having faces arranged at different angles to the axis of the gear, the said angles together providing a releasing angle; and wedging means arranged to receive said buffing strains and to cooperate with said parts having the releasing angle faces to apply pressure to said two parts and to freely release therefrom on the cessation of said strains, one of said faces being arranged at a relatively acute angle to said axis so that the wedging means may cause a great amount of friction and high cushioning resistance.

35. In a friction shock absorbing mechanism, the combination with a friction member provided with longitudinally extending friction surfaces; of a spring resistance; friction elements having also longitudinally extending friction surfaces cooperable with the friction surfaces of said member, one element having a face inclined at a keen wedge angle relative to the axis of said member and another element having a face inclined at a relatively obtuse releasing angle relative to the axis of said member; and a one-piece member having inclined faces co-acting directly with said inclined faces of said elements.

36. In a friction shock absorbing mechanism, the combination with a friction shell provided with interior longitudinally extending friction surfaces; a spring resistance; a pair of friction shoes within said shell, one shoe having an inner face extending at a keen wedge-acting angle with respect to the axis of the shell and the other having an inner face extending at a different and obtuse releasing angle with respect to said axis; and a one-piece member having correspondingly inclined faces co-acting with said faces of said shoes.

37. In a friction shock absorbing mechanism, the combination with a shell; of a spring resistance; friction-shoes slidable within said shell; and a movable wedge acting between the shoes, said shoes having inner faces inclined one to the other at an angle from within which the wedge is readily releasable upon discontinuance of the actuating compressing force, the inner face of one of said shoes being at an acute angle to create high frictional capacity in the mechanism and of such an acute angle per se that the initial collapse of the shoes and wedge must necessarily occur on other faces.

38. In a friction shock absorbing mechanism, the combination with a friction member having longitudinally extending friction surfaces, the effective distance between said surfaces at one end thereof being less than the effective distance between said surfaces at the opposite ends thereof; of a spring; friction-shoes cooperable with the friction surfaces of said member, one shoe having a wedge face extending at a relatively keen angle to the line of applied force and another shoe having a face inclined at a relatively blunt and releasing angle with respect to the line of applied force; and pressure-transmitting wedging means having inclined faces corresponding to and co-operable with the inclined faces of the friction shoes.

39. In a friction shock absorbing mechanism, the combination with a friction shell having interior friction surfaces so arranged that the effective distance between said surfaces at the open end of the shell is greater than the effective distance between said surfaces at the inner ends of the surfaces; of a spring; a plurality of friction-shoes having exterior friction surfaces co-operable with the shell friction surfaces, the said shoes being provided on their inner side with faces inclined relative to the axis of the shell and the inclined face of at least one shoe extending at a more acute angle than the inclined face of another shoe; and wedge-pressure-transmitting means having correspondingly inclined faces engaging and cooperating with the inner inclined faces of the shoes whereby, as said means and shoes are moved inwardly of the shell, a differential action is produced and effective upon those faces inclined at the greater angle to the line of applied force.

40. In a friction shock absorbing mechanism, the combination with a friction shell having interior friction surfaces, the effective distance between said surfaces at the open end of the shell being greater than the effective distance between said surfaces at the inner ends thereof; of a spring; and an expansible and collapsible friction unit comprised of a plurality of elements, some of said elements, considered as one group, having cooperating faces acutely inclined to the axis of the shell and operable as true wedge-acting faces in compression upon the application of pressure thereto, some of said elements including one element of said first group and an element additional thereto, considered as a second group having co-operating faces more obtusely inclined to the axis of the shell, said wedge-acting faces and said obtusely inclined faces being unsymmetrically disposed with respect to the axis of the shell and transversely opposed, the outer faces of the outermost elements of the unit frictionally cooperating with the surfaces of the friction shell.

41. In a friction shock absorbing mechanism, the combination with a column-acting member having friction surfaces converged relatively to each other; of a spring resistance; a friction-shoe cooperable with each of the friction surfaces of said member; and wedge-pressure-transmitting means, at least one of said shoes and said means having co-acting faces inclined to the axis of said member at an angle between the limits of 20° and 32½°, at least another shoe and said means having coacting faces inclined to said axis at an angle between the limits of 37½° and 47½°.

42. In a friction shock absorbing mechanism, the combination with a column-acting member having a plurality of longitudinally extending friction surfaces converged relatively to each other in an amount in excess of three-sixteenths of an inch in the effective distance between said surfaces from one end to the other end thereof; of a spring resistance; a friction-shoe cooperable with each friction surface of said member; and wedge pressure-transmitting means, said means and one of said shoes having co-acting faces inclined to the axis of said member at an angle between the limits of 20° and 32½°, another shoe and said means having co-acting faces inclined to said axis at an angle between the limits of 37½° and 47½°.

In witness that I claim the foregoing I have hereunto subscribed my name this 29th day of December 1922.

JOHN F. O'CONNOR.

Witnesses:
 FRANCES SAVAGE,
 HARRIETTE M. DEAMER.